Oct. 5, 1954   N. J. MUSCHAMP ET AL   2,690,904
CUTTER PICK ASSEMBLY FOR REVERSIBLE CHAIN MINING MACHINES
Filed June 19, 1951   2 Sheets-Sheet 1
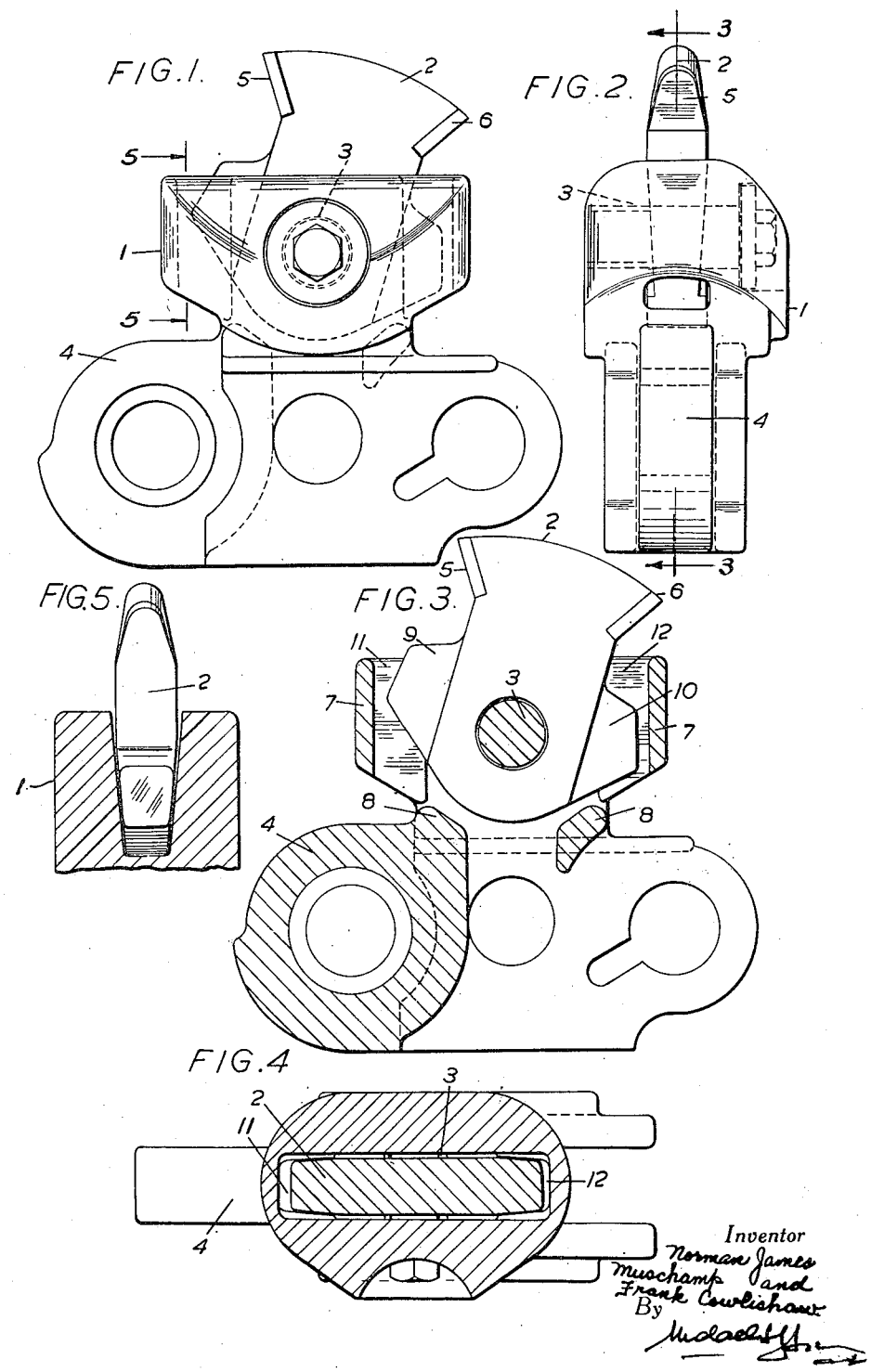

Oct. 5, 1954 N. J. MUSCHAMP ET AL 2,690,904
CUTTER PICK ASSEMBLY FOR REVERSIBLE CHAIN MINING MACHINES
Filed June 19, 1951 2 Sheets-Sheet 2
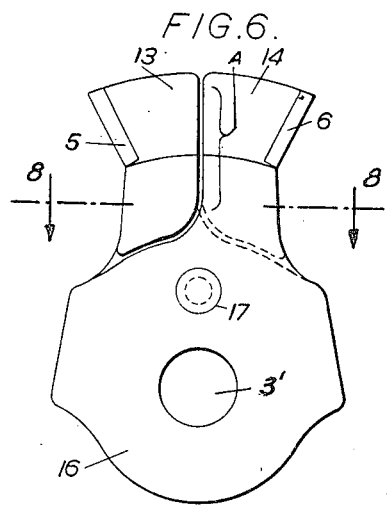
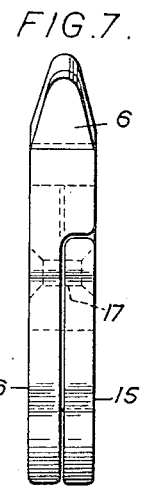
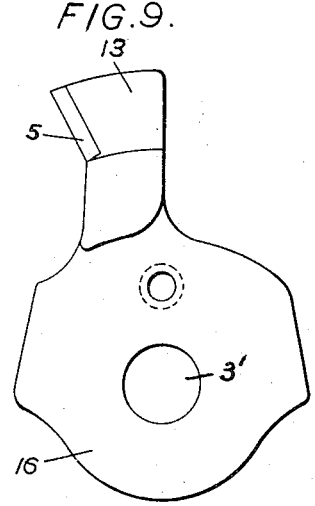

Patented Oct. 5, 1954

2,690,904

UNITED STATES PATENT OFFICE 2,690,904

CUTTER PICK ASSEMBLY FOR REVERSIBLE CHAIN MINING MACHINES

Norman James Muschamp and Frank Cowlishaw, Mansfield, England

Application June 19, 1951, Serial No. 232,392

Claims priority, application Great Britain June 23, 1950

6 Claims. (Cl. 262—33)

This invention concerns a cutter pick assembly in or for that type of coal cutter or other mining machine having a cutter element driven in an endless path and incorporating a succession of cutter assemblies each consisting of a mounting member carrying at least one cutter pick. Primarily the invention is concerned with a machine of the said type, known as a chain cutter, in which the said element is a chain for traversing round a jib, each or certain links of said chain being constituted by a mounting member aforesaid or having said member fixed thereon integrally or otherwise (the mounting members being known as boxes).

In machines of said type it is known to provide the cutter picks each with a substantially triangular point, whereof one edge constitutes a cutting edge which may be reinforced by a brazed-on tip of carbide or other hard material. When it is required to reverse the direction of traverse of the chain, it is also necessary to reverse the picks so that the cutting edges face the direction of travel, and for this purpose the picks have been made removable and capable of being re-fitted by hand in a reverse manner. It will be appreciated that this hand operation of reversing the pick is necessary but undesirable having regard to the time and labour involved; furthermore because the same cutting edges are used in both directions of travel, said edges wear comparatively quickly thereby necessitating frequent changing of the picks.

An object of the invention is to provide an improved cutter pick assembly by which time and labour is saved, and also to provide an assembly whereof the pick has a comparatively long life.

With the above objects in view the invention provides in or for a cutter element of a mining machine of the type referred to, a cutter pick assembly comprising two alternative cutter points, and means mounting them on the mounting member for movement between alternative positions in one of which point is disposed to operate during travel of the assembly in one direction and in the other of which the other point is disposed to operate during travel of the assembly in the reverse direction.

Conveniently the pick has a pair of cutter points, one directed forwardly and the other directed rearwardly of the line of travel of the assembly, and the mounting means are such that the pick is pivotally movable in opposite directions into engagement with limit stop means, and the arrangement being such that when the pick is in engagement with one of the stop means, one of the points is in an operative attitude, whilst the other point is in an inoperative attitude, and such that the attitudes of the points are reversed when the pick is in engagement with the other stop means. When a cutter pick assembly as above is in use on a cutter chain and the chain starts travelling the pick moves automatically by its engagement with the work to bring the appropriate point into operation according to the direction in which the assembly is then travelling. Means, for example associated with the stop means, may be provided for releasably locating the pick in its alternative attitudes, and said means are conveniently friction means (comprising for example cooperating tapered male and female members or parts) which may be such that the degree of friction progressively increases during the end parts of the movements of the pick into its alternative attitudes.

One or more abutments may be provided to which a hammer-like blow may be imparted to effect initial release or disengagement of the locating means. If desired the cutting edges of the points may be reinforced by brazed-on tips.

It will be understood that if the pick consists of a single member having the two cutting points and one of the points becomes damaged it will be necessary to replace the entire pick. To avoid this the pick may be made in two parts releasably fixed together, and one part carrying one point and the other part carrying the other point so that one point may be replaced independently of the other. The invention therefore also provides a cutter pick assembly comprising at least a pair of cutter points and means whereby each of the two cutter points is individually removable for replacement or other purposes. More specifically the two points are formed as initially separate members and means are provided for releasably connecting them together to function as a single unit in a mounting member; for this purpose those parts of the pick in the region of the points may be of a maximum desired thickness and abut each other edge to edge whilst other parts are of half such thickness and overlap each other. Any suitable means may be provided for releasably connecting the points together, such for example as a rivet connecting the half thickness parts.

The above and other features of the invention are set forth in the appended claims and are disclosed in the detailed description given by way of example of the particular embodiments illustrated in the accompanying drawings in which:

Figure 1 is a side view of a cutter pick assembly according to the invention.

Figure 2 is an end view of the assembly as seen from the left side of Fig. 1.

Figure 3 is a sectional side view taken along line 3—3 of Fig. 2 in the direction of the arrows.

Figure 4 is a sectional plan view of a variation of the structure of Figs. 1–3 and 5.

Figure 5 is a sectional detail taken along line 5—5 of Fig. 1 in the direction of the arrows.

Figure 6 is a detail side view of a modified pick.

Figure 7 is an end view of Figure 6 as seen from the right side thereof.

Figure 8 is a sectional plan view taken along line 8—8 of Figure 6 in the direction of the arrows.

Figure 9 is a side view of a part of the pick of Fig. 6.

Referring now to the drawings, a cutter pick assembly is provided comprising a cutter pick mounting member which may be a box 1 as aforesaid, and a dual-pointed pick 2 pivotally mounted in the box on an axle 3. The mounting may be such that the pick 2 is pivotally movable in a plane parallel to the sides of the box 1. The box 1 is fixed on a chain link 4 (integrally or otherwise as desired in known manner) and of course a plurality of the assemblies may be provided forming a cutter chain (by connecting the links together) for traversing round a jib as already referred to.

The pick points 5, 6 are substantially triangular in end view (Figure 2) and are disposed back to back so that one is directed forwardly and the other is directed rearwardly of the line of travel of the assembly. The two points 5, 6 are conveniently connected integrally in such a manner as to form a substantially quadrant-like member whereof the radial edges are cutting edges, and the arcuate edge of the quadrant may be dished or otherwise cut back if desired. Each cutting edge may be reinforced if desired by a carbide tip.

The said quadrant-like member (constituting the pick 2) is pivotally mounted in the box 1 so as to be capable of limited movement about the pivot 3, in opposite directions of the line of travel of the assembly, suitable limit stop means (referred to more fully hereinafter) being provided for engagement by the pick at each end of its movement. The arrangement is such that the pick 2 is movable to the same extent in each direction beyond a central vertical position so that when it is in one attitude, say as shown in Figures 1 and 3, the tip of point 5 projects from the box 1 to a greater extent than the tip of the other point 6, said point 5 being consequently in an operative position and the point 6 in an inoperative position. The positions of the points 5, 6 are reversed when the pick 2 is in the other attitude. The actual reversal of the pick 2 is effected automatically when it engages the work and it will be understood that in whichever direction the assembly travels over the work, the leading point will engage the work, whilst the trailing point will be clear of the work.

The aforesaid stop means may consist for example of transverse parts 7 and/or 8 of the box 1 and there may be also provided any suitable means for preventing promiscuous movement of the pick 2 about its pivot 3 for example when travelling round a chain sprocket of the jib. For this latter purpose in the example illustrated there is conveniently provided a pair of lugs or the like 9, 10 projecting, one forwardly and the other rearwardly, from the pick 2, and these lugs 9, 10 move respectively into and out of substantially vertical and tapered channels 11, 12 formed one in each end of the box 1. The channels 11, 12 are conveniently tapered downwards as shown in Figure 5 so that the fraction applied progressively increases during substantially downward movement of the lugs 9, 10, and/or if desired the channels may be tapered in a horizontal direction as shown in Figure 4 so that the friction increases progressively during substantially horizontal movement of the lugs 9, 10. The friction applied is conveniently sufficient to prevent promiscuous movement of the pick 2 but not sufficient to prevent automatic reversal of the pick 2 by its engagement with the work. If at any time the pick 2 does in fact stick in the wrong position it may be readily released by a suitable hammer-like blow, and to facilitate this the said lugs 9, 10 may be arranged so that when one lug is held in its channel, 11, 12 the other lug partly projects above the top of the box and vice versa; consequently each lug in turn becomes disposed to receive the hammer-like blow if desired.

It will be understood that the points 5, 6 of the pick 2 as above described do not rub on the work when in their inoperative attitude and this is an advantage particularly when carbide inserted tips are employed as it ensures that tips when inoperative do not become detached from the pick by rubbing of the work on the tip in a direction from rear to front thereof.

In a modification shown Figures 6 to 9 the pick is formed in two separate parts 13, 14 each incorporating one of the points 5, 6. More specifically for this purpose the pick may be split on a central radius of the quadrant for that outer portion A, thereof which includes the points 5, 6 so that the points are divided from each other and are of the same maximum thickness desired; (see Figures 7 and 8) the remainder of the pick is split centrally of its thickness to form two half thickness parts (as shown in said Figures 7 and 8) 15, 16 which fit face to face and surround the pivot 3 of the quadrant. Figure 9 illustrates the part 13, when removed from the other parts and the other part 14 is identical but is reversed when fitted to the part 13. The two parts 13, 14 are conveniently releasably connected together by a rivet 17 located say above the pivot 3 of the quadrant and extending through the two half thickness parts of the pick, the aligned openings 3' through which pivot 3 is adapted to extend being shown in Fig. 6.

It will be appreciated that by providing the double pointed or self-reversible pick in two parts, either part may be removed individually for replacement or other purposes without affecting the other parts.

We claim:

1. Cutting apparatus, comprising, in combination, an elongated rigid support having opposite side wall portions spaced from each other and opposite end wall portions interconnecting said side wall portions, said side wall portions, as they approach said end wall portions, being located progressively nearer to each other so as to provide between said side walls a space which is largest between the central part of said side wall portions and gradually narrows toward said end wall portions; and a cutting means turnably mounted in said support between said side walls at said central part thereof and extending beyond said side wall portions, said cutting means having a rigid, elongated portion extending between and along said side walls and being provided with opposite tapered end portions one of which wedges between said side walls when said cutting means is turned in one direction on said support and the other of which wedges between said side walls when said cutting means is turned in an opposite direction on said support.

2. Cutting apparatus, comprising, in combination, an elongated rigid support having opposite side wall portions spaced from each other and opposite end wall portions interconnecting said side wall portions, said side wall portions, as they approach said end wall portions, being located progressively nearer to each other so as to provide between said side walls a space which is largest between the central part of said side wall portions and gradually narrows toward said end wall portions; and a cutting means turnably mounted in said support between said side walls at said central part thereof and extending beyond said side wall portions, said cutting means having a rigid, elongated portion extending between and along said side walls and being provided with opposite tapered end portions one of which wedges between said side walls when said cutting means is turned in one direction on said support and the other of which wedges between said side walls when said cutting means is turned in an opposite direction on said support, each of said tapered end portions of said elongated, rigid portion of said cutting means having a face located beyond said side walls of said support when the other of said tapered end portions is wedged between said side walls so that said face of said tapered end portion is accessible to be struck by a hammer, or the like, to unwedge said cutting means.

3. Cutting apparatus, comprising, in combination, an elongated rigid support having opposite side wall portions spaced from each other and opposite end wall portions interconnecting said side wall portions, the latter having adjacent each end wall portion oppositely inclined side surfaces facing each other and converging toward each other along the length of said end wall portion so as to provide a space between said side wall portions which is largest between said side wall portions at one end of said end wall portion; and a cutting means turnably mounted in said support between said side walls at a central part thereof and extending beyond said side wall portions, said cutting means having a rigid, elongated portion extending between and along said side walls and being provided with opposite tapered end portions one of which wedges between said side walls when said cutting means is turned in one direction on said support and the other of which wedges between said side walls when said cutting means is turned in an opposite direction on said support.

4. Cutting apparatus, comprising, in combination, an elongated rigid support having opposite side wall portions spaced from each other and opposite end wall portions interconnecting said side wall portions, the latter having adjacent each end wall portion oppositely inclined side surfaces facing each other and converging toward each other along the length of said end wall portion so as to provide a space between said side wall portions which is largest between said side wall portions at one end of said end wall portion; and a cutting means turnably mounted in said support between said side walls at a central part thereof and extending beyond said side wall portions, said cutting means having a rigid, elongated portion extending between and along said side walls and being provided with opposite tapered end portions one of which wedges between said side walls when said cutting means is turned in one direction on said support and the other of which wedges between said side walls when said cutting means is turned in an opposite direction on said support, each of said tapered end portions of said elongated, rigid portion of said cutting means having a face located beyond said side walls of said support when the other of said tapered end portions is wedged between said side walls so that said face of said tapered end portion is accessible to be struck by a hammer, or the like, to unwedge said cutting means.

5. Cutting apparatus, comprising, in combination, an elongated rigid support having opposite side wall portions spaced from each other and opposite end wall portions interconnecting said side wall portions, the latter having adjacent each end wall portion oppositely inclined side surfaces facing each other and converging toward each other along the length of said end wall portion so as to provide a space between said side wall portions which is largest between said side wall portions at one end of said end wall portion, said side wall portions, as they approach said end wall portions, being located progressively nearer to each other so that the space between said side walls is largest at the central part thereof and gradually narrows toward said end wall portions; and a cutting means turnably mounted in said support between said side walls at said central part thereof and extending beyond said side wall portions, said cutting means having a rigid, elongated portion extending between and along said side walls and being provided with opposite tapered end portions one of which wedges between said side walls when said cutting means is turned in one direction on said support and the other of which wedges between said side walls when said cutting means is turned in an opposite direction on said support.

6. Cutting apparatus, comprising, in combination, an elongated rigid support having opposite side wall portions spaced from each other and opposite end wall portions interconnecting said side wall portions, the latter having adjacent each end wall portion oppositely inclined side surfaces facing each other and converging toward each other along the length of said end wall portion so as to provide a space between said side wall portions which is largest between said side wall portions at one end of said end wall portion, said side wall portions, as they approach said end wall portions, being located progressively nearer to each other so that the space between said side walls is largest at the central part thereof and gradually narrows toward said end wall portions; and a cutting means turnably mounted in said support between said side walls at said central part thereof and extending beyond said side wall portions, said cutting means having a rigid, elongated portion extending between and along said side walls and being provided with opposite tapered end portions one of which wedges between said side walls when said cutting means is turned in one direction on said support and the other of which wedges between said side walls when said cutting means is turned in an opposite direction on said support, each of said tapered end portions of said elongated, rigid portion of said cutting means having a face located beyond said side walls of said support when the other of said tapered end portions is wedged between said side walls so that said face of said tapered end portion is accessible to be struck by a hammer, or the like, to unwedge said cutting means.

References Cited in the file of this patent

UNITED STATES PATENTS

| Number | Name | Date |
|---|---|---|
| 2,085,756 | Joy | July 6, 1937 |
| 2,330,081 | Phipps | Sept. 21, 1943 |
| 2,569,066 | Lewis | Sept. 25, 1951 |
| 2,575,980 | Simmons | Nov. 20, 1951 |

FOREIGN PATENTS

| Number | Country | Date |
|---|---|---|
| 768,369 | France | Aug. 4, 1934 |